July 31, 1928.

R. G. RICHARDSON

SPEED GOVERNOR

Filed April 9, 1923

1,678,914

Inventor
Rodney G. Richardson
R G Richardson Atty.

Patented July 31, 1928.

1,678,914

UNITED STATES PATENT OFFICE.

RODNEY G. RICHARDSON, OF CHICAGO, ILLINOIS.

SPEED GOVERNOR.

Application filed April 9, 1923. Serial No. 630,705.

My invention relates in general to speed governors, and may be considered as a modification of or improvement on the speed governor shown in my pending application, S. N. 598,773, filed Nov. 3, 1922. In the application referred to, an improved type of governor is disclosed depending for its operation on the utilization of a gyroscopic couple generated by rotating a heavy body, as, for example, a fly wheel, about two substantially perpendicular axes. The governor disclosed in the instant case operates on the same general principles but differs radically in design, and is especially adapted for use as a shaft governor, although its use is not necessarily so limited.

A physical embodiment of the invention is illustrated in the accompanying drawing, in which:—

Figure 2:
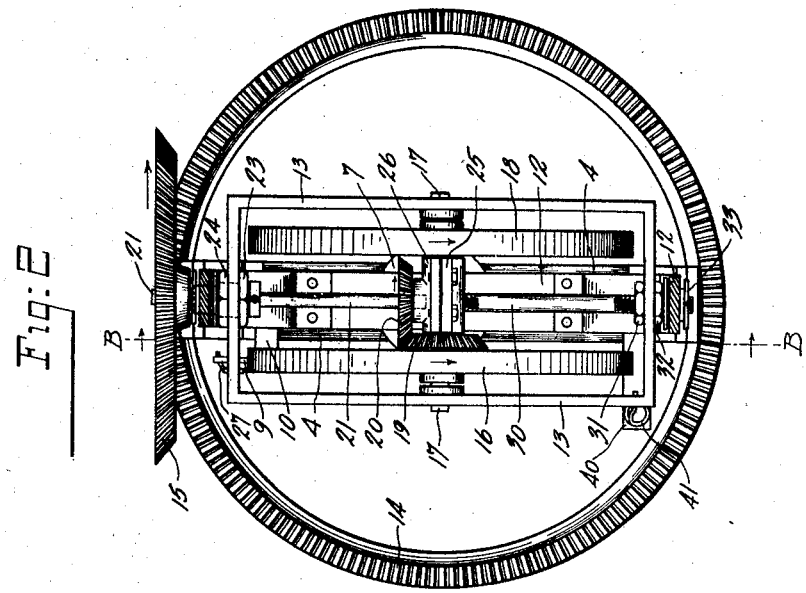
Figure 1:
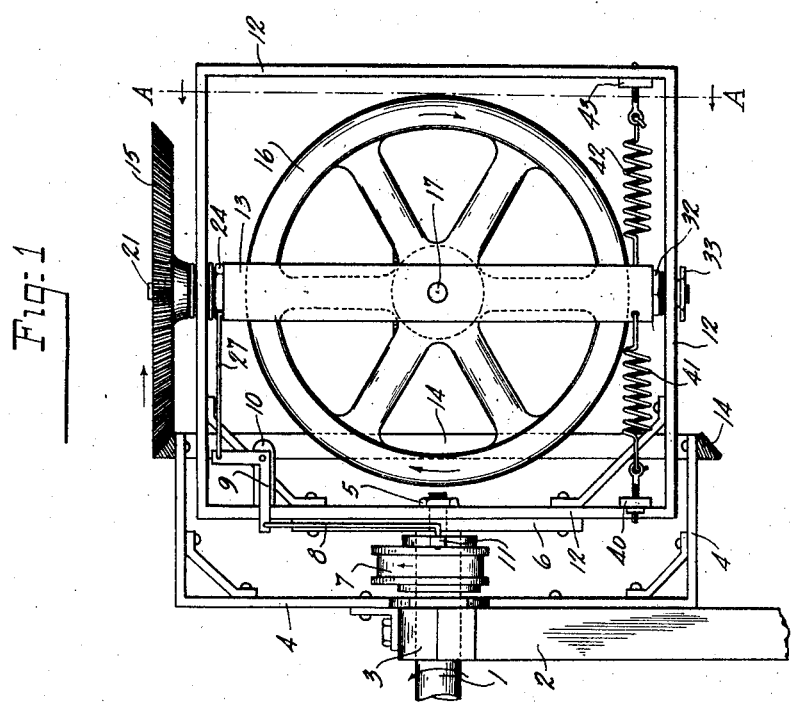

Fig. 1 is a side view of the improved governor, with the gear wheel 14 cut away on the line B—B, Fig. 2, and Fig. 2 is an end view of the same, with part of one of the frames cut away on the line A—A, Fig. 1.

Referring to the drawing, and particularly to Fig. 1, the reference character 1 indicates the shaft of a steam engine, either the main shaft or another shaft driven at engine speed. As we are concerned only with the governor the shaft is only partly shown, with one of the bearings 3 by means of which it is supported at one end on the frame 2. On the end of the shaft is secured the rectangular frame 12, which supports all the moving parts of the device. The frame 12 is stiffened by a plate 6 and the two corner braces illustrated, and is clamped in position against a shoulder on the shaft by means of nut 5. The frame 12, therefore, rotates with the shaft.

Pivotally supported inside the frame 12 is a second rectangular frame 13, most clearly shown in Fig. 2, which in turn supports the fly wheels 16 and 18. Both fly wheels are rigidly secured to the shaft 17, which is rotatably supported in suitable bearings on the frame.

The means for driving the fly wheels 16 and 18 will now be considered. This comprises a fixed gear 14, a driven gear 15, a shaft 21, and the two beveled pinions 20 and 19. Gear wheel 14 is supported by a bracket 4, which is attached to the engine frame in any suitable manner. The driven gear 15 is rigidly secured to the upper end of shaft 21.

At its lower end shaft 21 carries the pinion 20, in mesh with pinion 19, which latter pinion is of course rigidly secured to shaft 17, or to the adjacent fly wheel.

The upper bearing for shaft 21 comprises a hollow bolt or stud 23, which also forms the upper pivot for frame 13. The shank of the stud extends through a hole in frame 13 and is threaded part way to take the nut 24, by means of which the stud is rigidly clamped to the frame. The unthreaded portion of the shank of the stud (slightly reduced in diameter) passes through a bearing in the frame 12. Thin washers may be inserted above and below the frame 12 as illustrated. The stud 23 is made hollow to provide a bearing for shaft 21, as stated.

The lower bearing of shaft 21 is in the upper portion of a member 26, as clearly appears in the drawing. Members 26 and 25 are securely clamped together on opposite sides of shaft 17 and have suitable bearing surfaces inside to permit the free rotation of the shaft. The lower bearing of shaft 21 is, therefore, to a considerable extent supported on shaft 17, but to assist in this and also to prevent turning of the bearing and to maintain it in alignment with shaft 21 a heavy bar 30 is provided. This bar is securely attached to member 25, by screw threads or otherwise, and at its lower end is fixed to the frame 13. To this end the bar 30 may be threaded as shown, and two nuts 31 and 32 are used to securely hold it in position. The lower end of the bar extends through a somewhat larger hole in frame 12, and a hexagonal headed sleeve 33, threaded on the inside, is tightened against the lower nut 32. This sleeve forms the lower pivot of frame 13. A washer may be interposed between the frame 12 and nut 32 as shown.

For the purpose of controlling the valve gear, a loose eccentric 7 is mounted on the shaft 1 between the bearing and the plate 6. Movement of the frame 13 may be communicated to the eccentric in any desired manner. As shown, a link or rod 27 is attached at one end to frame 13 and at the other to bell crank lever 9, which is pivotally supported on a bracket 10 attached to frame 12. Another link or rod 8 extends between the bell crank lever and the arm 11 of the eccentric. This arrangement will cause the eccentric 7 to turn on shaft 1 when the frame 13 turns on its pivots.

Movement of the frame 13 is opposed by two coil springs 41 and 42, attached to frame 13 on opposite sides thereof, and to brackets 40 and 43 mounted on frame 12. The tension of the springs is adjustable by means of the eye bolts and nuts.

The operation of the governor is as follows: When the engine is started, and assuming that the shaft 1 runs in the direction of the arrow, or clockwise as viewed from the right, the gear wheel 15 will begin to revolve in the direction shown by the arrows, Figs. 1 and 2. This turns shaft 21, and the motion is communicated to the fly wheels 16 and 18 by pinions 20 and 19, the fly wheels rotating in the direction indicated. A gyroscopic couple is thus set up by virtue of which shaft 17 tends to assume a position in alignment with shaft 1 with its direction of rotation the same. A force will be set up, therefore, which tends to turn the frame 13 about its pivots against the tension of springs 41 and 42. This force is utilized to shift the eccentric 7 around the shaft as the critical speed is reached and change the angle of advance, the governing action being the same as in the well known Buckeye centrifugal shaft governor. It will be understood, however, that any other well known gear may be used if desired, including those types in which the eccentricity is varied as well as the angle of advance.

Regulation for particular speeds is accomplished by changing the tension of the springs 41 and 42, as will be readily appreciated. Although not shown in the drawing suitable stops may be provided to limit the movement of frame 13, the location depending on which portion of the travel of the frame is to be utilized for regulating purposes. For example, if a portion of the 4th quadrant is to be used as the working range a normal position stop may be provided to hold the frame 13 say 15 or 20 degrees from the position shown, in the direction of its movement when running, which will hold the springs under tension. The position of the other stop, if one is used, will depend on the maximum travel in operation, which in turn will depend on the ratio of the lever arms used to operate the valve gear and on the range of movement of the gear in use. These matters are of course adjusted to suit the conditions under which the governor is being used.

I am aware that changes may be made in the design and construction of the various parts, and in their relative size, etc. and that a governor of this style is not necessarily limited in its use to the example mentioned herein; I do not, therefore, wish to be held to the particular form shown but desire to include and have protected by Letters Patent all forms and modifications of my invention which come within the scope of the appended claims.

What I claim is:

1. In a shaft governor, a frame rigidly attached to the engine shaft, a second frame pivotally supported on said first frame, a flywheel rotatably supported on said second frame, a shaft for driving said flywheel disposed perpendicular to its axis of rotation and extending through one of the supporting pivots for said second frame, means for rotating said last mentioned shaft when the frames are rotated by the engine shaft, means for communicating movement of the second frame about its pivots to the engine control equipment, and an adjustable spring opposing such movement.

2. In a shaft governor, the combination, with a duplex flywheel, of means for causing the engine shaft to rotate said fly wheel about two axes disposed at an angle to each other, an eccentric mounted on said shaft, and means for causing the resulting gyroscopic couple to rotate said eccentric on the shaft.

3. In a gyroscopic governor, an outer frame, an inner frame pivoted on said outer frame, one of said pivots having an opening therein, a flywheel rotatably mounted on the inner frame, and a shaft for driving said flywheel passing through said opening.

4. In a speed responsive device, a frame, a flywheel rotatably supported in said frame, a drive shaft for said flywheel perpendicular to its axis of rotation, bevel gears connecting said drive shaft and the flywheel shaft, a second frame, and pivots supporting said first frame on said second frame so as to permit rotation thereof about an axis passing longitudinally through the center of said drive shaft.

5. In a gyroscopic governor, a gyroscope comprising two fly wheels, a pivoted frame in which said fly wheels are mounted on a shaft, a drive shaft passing through one of the pivots of said frame, and gears between said fly wheels for coupling said shafts together.

6. In a speed responsive device, a gyroscope comprising two fly wheels supported on a shaft, means for rotating said fly wheels on said shaft as an axis and for simultaneously producing another rotation about a second shaft the axis of which intersects said first shaft at a point midway between said fly wheels, means permitting a third movement about an axis intersecting the first two axes of rotation at their point of intersection, a rotatable member mounted on said second shaft and means for communicating the last mentioned movement to said member.

7. In a speed responsive device, a heavy body having three axes of rotation intersecting each other at a common point, said body being symmetrical with respect to all its axes, means for causing simultaneous rotations about two of said axes to generate a gyroscopic couple by means of which rotation is produced about the third axis, a member independently rotatable about the first axis and means for causing the movement about the third axis to rotate said member around said first axis as set forth.

8. In a shaft governor, the combination, with a horizontal shaft, a valve controlling member rotatable thereon, of a gyroscope operated by said shaft, and means for causing the couple produced by said gyroscope to rotate said control member.

9. In a shaft governor, the combination, with a shaft carrying eccentric, of a gyroscope operated by said shaft, means for causing the couple produced by said gyroscope to shift said eccentric and an adjustable spring opposing said couple by means of which the speed at which the shift takes place can be regulated.

10. In a shaft governor, the combination, with a shaft carrying a loose eccentric, of a gyroscope operated by said shaft, and means for causing the gyroscopic couple generated to shift said eccentric.

11. In a shaft governor, the combination, with a shaft carrying a speed controlling member rotatably mounted thereon, of means operated by said shaft for producing a gyroscopic couple, and means for utilizing said couple to alter the angular relation between said member and said shaft.

12. In a speed responsive device, a gyroscope having three axes of rotation, means responsive to rotation about the first axis to cause rotation about the second axis, said means comprising two pairs of gears and a shaft coincident with the third axis, and means for communicating movement of said gyroscope about its third axis to a point outside said device.

13. In a speed responsive device, a gyroscope rotor and a shaft therefor, a drive shaft geared to said first shaft, a frame supporting said first shaft and rotatable about an axis coincident with said drive shaft, a second frame supporting said first frame for rotation as set forth, and means for rotating said second frame.

14. The combination, with a main drive shaft, of a speed responsive device supported on and rotated by said shaft, said device comprising a flywheel, an auxiliary shaft for rotating said flywheel, a drive shaft positioned at right angles to said main and auxiliary shafts and geared to said auxiliary shaft, and means responsive to the rotation of said main shaft for rotating said drive shaft on its own axis.

15. In a speed responsive device, a main shaft, a gyroscope rotor having a shaft supported on said main shaft at an angle thereto, and means for rotating the rotor shaft on its own axis responsive to rotation of said main shaft, said means including a drive shaft geared to the rotor shaft and supported in a position perpendicular to both said first mentioned shafts.

16. In a speed responsive device, a main shaft, a heavy body supported on said shaft and rotatable therewith, means responsive to rotation of said shaft for rotating said body about an axis which is non-coincidental with said shaft, thereby generating a gyroscopic couple tending to rotate said body about a third axis, a device loosely supported on said shaft and free to turn around said shaft, and mechanism for turning said device around said shaft responsive to rotation of said body about said third axis.

17. In a speed responsive device, outer and inner frames pivotally connected, means limiting the relative movements of said frames about the pivotal connection, a flywheel suspended for rotation within the inner frame, a drive shaft having one end geared to said flywheel and having the other end extended through both said frames, means for rotating the outer frame and means responsive to such rotation for rotating the drive shaft.

18. In a speed responsive device, a main shaft, a fixed gear, a gyroscope supported on said main shaft, said gyroscope comprising two other shafts positioned at an angle to one another and to said main shaft, a gear on one end of the second shaft engaging said fixed gear for driving the second shaft responsive to rotation of the main shaft, gears connecting the second and third shafts for driving the third shaft from the second, and a rotor mounted on said third shaft.

Signed at Chicago, county of Cook, and State of Illinois, this 7th day of March, 1923.

RODNEY G. RICHARDSON.